(12) United States Patent
Tauchi (10) Patent No.: US 9,058,030 B2
(45) Date of Patent: Jun. 16, 2015

(54) HORIZONTAL MACHINE TOOL (75) Inventor: Hiroyuki Tauchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 184 days.

(21) Appl. No.: 13/882,201

(22) PCT Filed: Dec. 8, 2011

(86) PCT No.: PCT/JP2011/078412
§ 371 (c)(1),
(2), (4) Date: Jun. 20, 2013

(87) PCT Pub. No.: WO2012/086421
PCT Pub. Date: Jun. 28, 2012

(65) Prior Publication Data
US 2013/0264989 A1    Oct. 10, 2013

(30) Foreign Application Priority Data

Dec. 24, 2010  (JP) ................................. 2010-287332

(51) Int. Cl.
*B23Q 15/18* (2006.01)
*B23C 1/027* (2006.01)
(Continued)

(52) U.S. Cl.
CPC ..... *G05B 19/404* (2013.01); *Y10T 409/309688* (2015.01); *Y10T 409/3098* (2015.01);
(Continued)

(58) Field of Classification Search
CPC .... B23Q 15/007; B23Q 15/18; B23Q 11/001; B23Q 11/0017; B23Q 11/0025; B23Q 15/14; Y10T 408/92; Y10T 409/309744; Y10T 409/3098; Y10T 409/309688; B23C 1/027

IPC ................................ B23Q 15/007,15/14, 15/18
See application file for complete search history.

(56) References Cited

U.S. PATENT DOCUMENTS 3,008,381 A  *  11/1961  Jones .............................. 409/237
3,264,905 A  *   8/1966  Erikson .......................... 408/234
(Continued)

FOREIGN PATENT DOCUMENTS

| CN | 1142996 A | 2/1997 |
| CN | 1214003 A | 4/1999 |

(Continued)

OTHER PUBLICATIONS

Machine translation of WO 2009-098931, printed Feb. 2015.*
(Continued)

*Primary Examiner* — Daniel Howell
(74) *Attorney, Agent, or Firm* — Birch, Stewart, Kolasch & Birch, LLP (57) ABSTRACT

Provided is a horizontal machine tool which achieves remarkable accuracy improvement by correcting spatial accuracy while stabilizing the swing of a main spindle. To this end, a horizontal machine tool (10) is provided with: a ram tension bar (20) which corrects the deflection of a ram (17); a lifting force correction mechanism (30) which corrects the inclination of a saddle (16) by adjusting lifting force at two positions where the saddle (16) is lifted; a column tension bar (40) which corrects the bend of a column (14); and a control device which controls the ram tension bar (20), the lifting force correction mechanism (30) and the column tension bar (40) and has a spatial accuracy correction function of correcting the spatial accuracy by numerical control. The control device corrects only the swing of the tip of a main spindle (18) using the ram tension bar (20), the lifting force correction mechanism (30) and the column tension bar (40), and corrects the deterioration of the spatial accuracy due to sinking of a bed (11) using the spatial accuracy correction function.

3 Claims, 9 Drawing Sheets

(51) Int. Cl.
*G05B 19/404* (2006.01)
*B23Q 11/00* (2006.01)

(52) U.S. Cl.
CPC ............ *B23Q15/18* (2013.01); *B23Q 11/0025* (2013.01); *G05B 2219/49195* (2013.01); *B23Q 11/0028* (2013.01)

(56) References Cited

U.S. PATENT DOCUMENTS

| | | | | |
|---|---|---|---|---|
| 3,853,423 | A * | 12/1974 | Quack | 408/235 |
| 4,149,822 | A * | 4/1979 | Lehmkuhl | 408/235 |
| 4,447,178 | A * | 5/1984 | Esser | 409/80 |
| 4,520,700 | A | 6/1985 | Herzog et al. | |
| 4,775,926 | A | 10/1988 | Hasegawa et al. | |
| 5,053,973 | A * | 10/1991 | Fujii et al. | 700/175 |
| 5,214,592 | A * | 5/1993 | Serizawa et al. | 700/193 |
| 6,821,064 | B2 * | 11/2004 | Hirabayashi | 409/238 |

FOREIGN PATENT DOCUMENTS

| | | |
|---|---|---|
| CN | 1333108 A | 1/2002 |
| CN | 101306475 A | 11/2008 |
| JP | 49-33480 B | 6/1972 |
| JP | 50-38827 B1 | 12/1975 |
| JP | 59-88231 A | 5/1984 |
| JP | 62-74550 A | 4/1987 |
| JP | 1-114241 U | 8/1989 |
| JP | 1-31367 Y2 | 9/1989 |
| JP | 2007-216319 A | 8/2007 |
| WO | WO 2009098931 A1 * | 8/2009 |

OTHER PUBLICATIONS

Chinese Office Action dated Nov. 4, 2014 for related Application No. 201180051655.6 with an English translation.

* cited by examiner

DEFLECTION AMOUNTS OF RAM IN CASES WHERE RAM IS DELIVERED

Fig. 7

CHANGES IN SWINGING OF MAIN SPINDLE IN CASES WHERE RAM IS DELIVERED

HORIZONTAL MACHINE TOOL

TECHNICAL FIELD

The present invention relates to a horizontal machine tool such as a horizontal boring machine.

BACKGROUND ART

In a conventional art, a horizontal machine tool such as a horizontal boring machine is known as one of machine tools for machining a workpiece.

PRIOR ART DOCUMENT

Patent Document

Patent Document 1: Japanese Patent Application Publication No. 2007-216319

SUMMARY OF THE INVENTION

Problems to be Solved by the Invention

Figure 10:
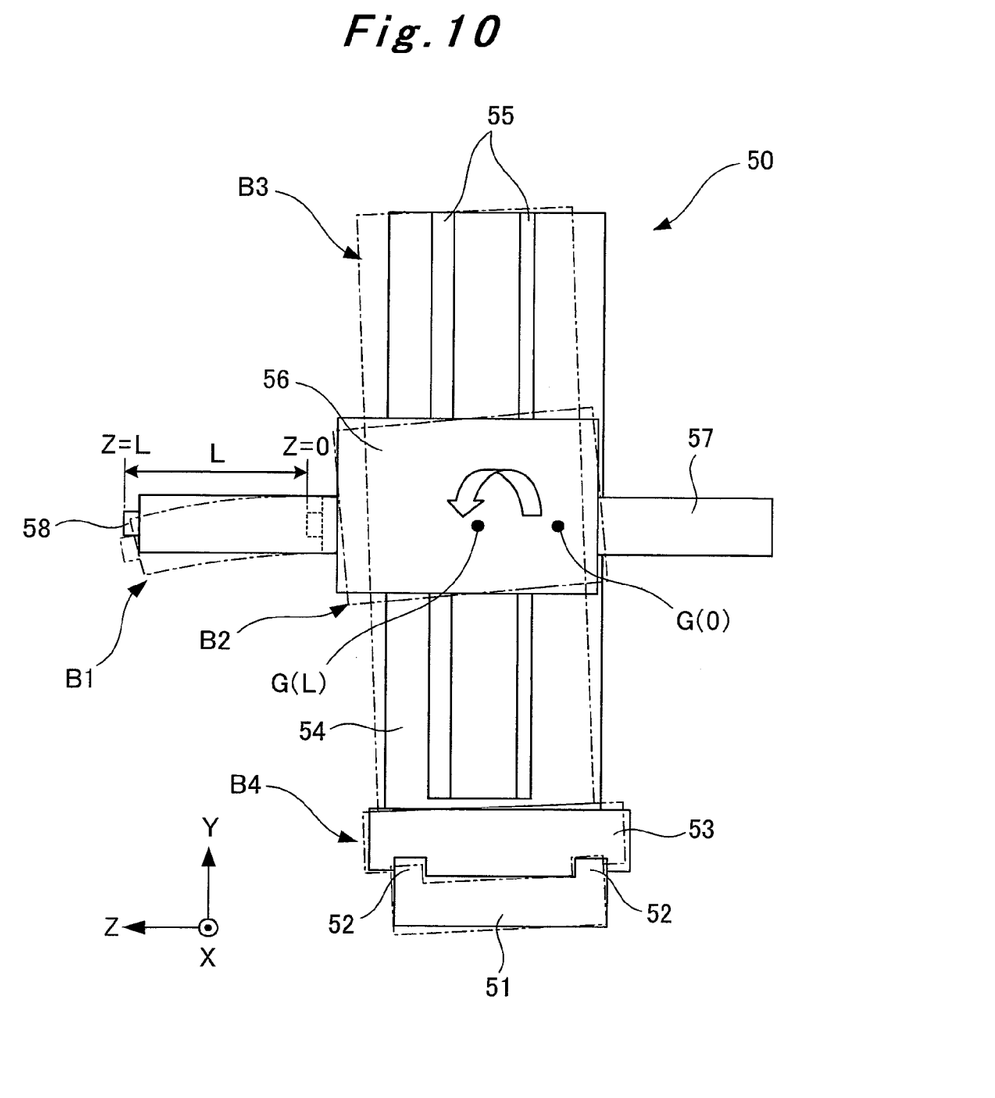
FIG. 10 is a view for explaining a problem of a conventional horizontal machine tool.

FIG. 10 shows a conventional horizontal machine tool and the outline thereof is described.

In a horizontal machine tool 50, a column base 53 is provided on a guide 52 of a bed 51 to be movable in a horizontal direction (X direction) and a column 54 stands on the column base 53. A guide 55 is provided on one lateral surface of the column 54 and a saddle 56 is supported on the guide 55 to be movable in a vertical direction (Y direction). A ram 57 is supported by the saddle 56 to be movable in a horizontal direction (Z direction). The ram 57 has a main spindle 58 and machining of a workpiece being a machining target is performed by using a tool attached to a front end of the main spindle 58. In the machining, desired machining is performed while moving the column base 53, the saddle 56, and the ram 57 respectively in a front-rear direction, an up-down direction, and a right-left direction.

Next, a problem of the horizontal machine tool 50 is described with reference to FIG. 10.

The horizontal machine tool 50 has a problem that, when the ram 57 is delivered (for example, delivered from the position of Z=0 to the position of Z=L; L is the maximum delivery amount of the ram 57), the machining accuracy is deteriorated by occurrence of deflection of the ram 57 due to its own weight (B1 in FIG. 10) as well as by occurrence of inclination of the saddle 56 (B2 in FIG. 10), inclination of the column 54 (B3 in FIG. 10), inclination of the bed 51 (B4 in FIG. 10), and inclination of a jack (omitted in the drawing) which are caused by a moment change due to a change in the center of gravity (G(0) to G(L)) in the delivery.

The present invention has been made in view of the problem described above and an object thereof is to provide a horizontal machine tool which corrects a spatial accuracy with swinging of a main spindle stabilized and can be thereby drastically improved in the machining accuracy.

Means for Solving the Problems

A horizontal machine tool according to a first aspect of the invention for solving the above problem includes: a column provided on a bed to be movable in a horizontal direction; a saddle supported on a lateral surface of the column to be movable in a vertical direction; and a ram held by the saddle to be movable in a horizontal direction and provided with a main spindle at a front end, the horizontal machine tool comprising:
a ram tension bar configured to correct deflection of the ram;
a suspending force correcting mechanism configured to correct inclination of the saddle by adjusting suspending forces at two positions for suspending the saddle;
a column tension bar configured to correct bending of the column; and
a control device configured to control the ram tension bar, the suspending force correcting mechanism, and the column tension bar and having a spatial accuracy correcting function of correcting a spatial accuracy by numerical control, wherein the control device
corrects only swinging of a front end of the main spindle by using the ram tension bar, the suspending force correcting mechanism, and the column tension bar, and
corrects deterioration in the spatial accuracy due to sinking of the bed by using the spatial accuracy correcting function.

A horizontal machine tool according to a second aspect of the invention for solving the above problem is that wherein, in the horizontal machine tool described in the first aspect of the invention, two of the column tension bars are provided on a side of a lateral surface of the column opposite to the lateral surface on which the saddle is supported.

A horizontal machine tool according to a third aspect of the invention for solving the above problem is that wherein, in the horizontal machine tool described in the second aspect of the invention, the column tension bars are arranged respectively at positions point symmetric to two load centers with respect to a center of a second moment of area of the column, the two load centers being portions on which loads of the two suspending forces act.

Effect of the Invention

According to the present invention, in the horizontal machine tool, the correction with the ram tension bar, the suspending force correcting mechanism, and the column tension bar is used only to stabilize the swinging of the front end of the main spindle. Moreover, the spatial accuracy is corrected by using the spatial accuracy correction by the numerical control (NC) with the swinging of the front end of the main spindle stabilized. This achieves both the stabilization of the swinging of the main spindle and the improvement in the spatial accuracy and the machining accuracy can be thereby drastically improved.

MODE FOR CARRYING OUT THE INVENTION

An embodiment of a horizontal machine tool according to the present invention is described below with reference to FIGS. 1 to 9.

Embodiment 1

Figure 1:
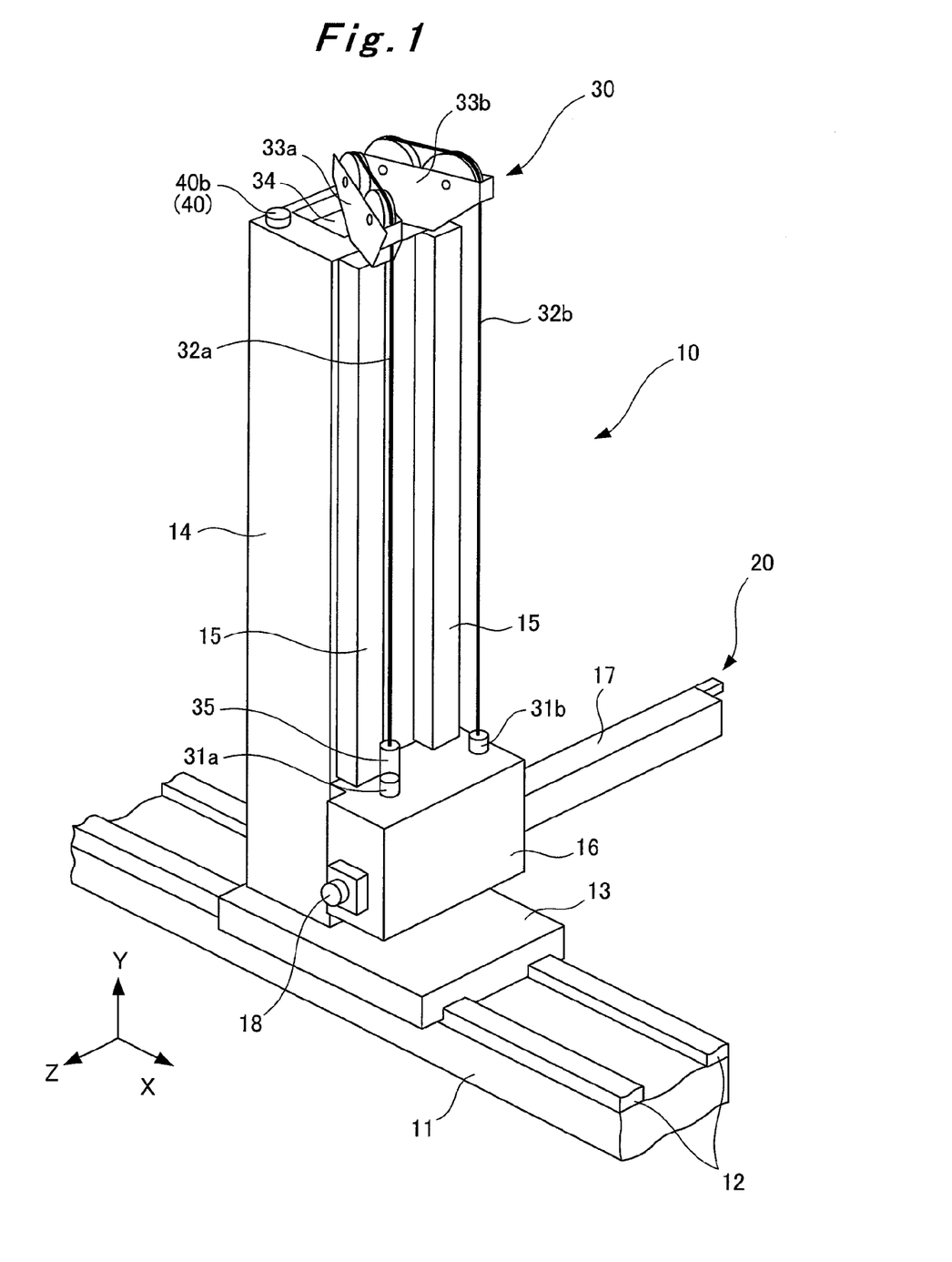
FIG. 1 is a perspective view showing an example of an embodiment of a horizontal machine tool according to the present invention.

In a horizontal machine tool 10 shown in FIG. 1, a column base 13 is provided on a guide 12 of a bed 11 to be movable in a horizontal direction (X direction) and a column 14 stands on the column base 13. A guide 15 is provided on one lateral surface of the column 14 and a saddle 16 is supported on the guide 15 to be movable in a vertical direction (Y direction). A ram 17 is held by the saddle 16 to be movable in a horizontal direction (Z direction). The ram 17 has a main spindle 18 and machining of a workpiece being a machining target is performed by using a tool attached to a front end of the main spindle 18. In the machining, desired machining is performed while moving the column base 13, the saddle 16, and the ram 17 respectively in a front-rear direction, an up-down direction, and a right-left direction.

As described above, a horizontal machine tool has a problem that deterioration in the machining accuracy is caused by occurrence of (B1) deflection of the ram 17 due to its own weight, (B2) inclination (turning) of the saddle 16 due to a change in the center of gravity, (B3) inclination (bending) of the column 14 due to the change in the center of gravity, and (B4) inclination (sinking) of the bed 11 (hereafter, also including a jack) due to the change in the center of gravity.

Figure 2:
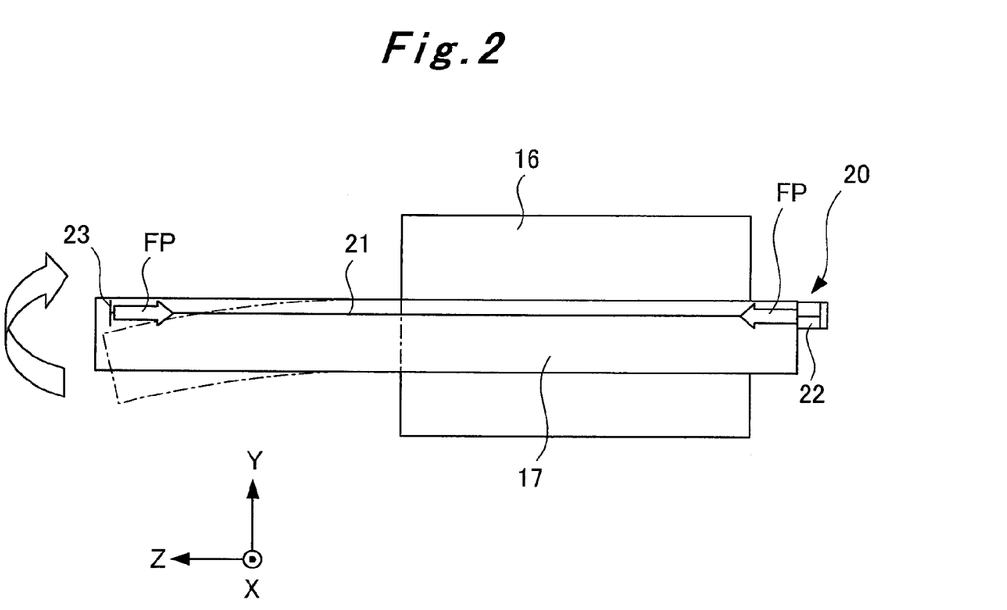
FIG. 2 is a view for explaining a ram tension bar in the horizontal machine tool shown in FIG. 1.

In this respect, as shown in FIGS. 1 and 2, a ram tension bar 20 is provided inside the ram 17 (above the center line of the ram 17) to extend in a delivering direction (Z direction) of the ram 17 in the horizontal machine tool 10. The ram tension bar 20 includes a cylindrical rod 21 disposed to extend in a longitudinal direction of the ram 17, a cylinder portion 22 disposed in a rear end portion of the ram 17, and a stopper 23 disposed at a front end portion of the ram 17. When the ram 17 is delivered, hydraulic pressure is supplied to the cylinder portion 22 by using a control device (omitted in the drawings) of the horizontal machine tool 10 and a tensile force FP is thereby applied to both ends of the ram 17 by the cylinder portion 22 and the stopper 23. Both ends of the ram 17 are pulled inside by this tensile force FP and a bending moment is thus generated at the front end of the ram 17. The deflection of the ram 17 due to its own weight is corrected by this bending moment.

Figure 3:
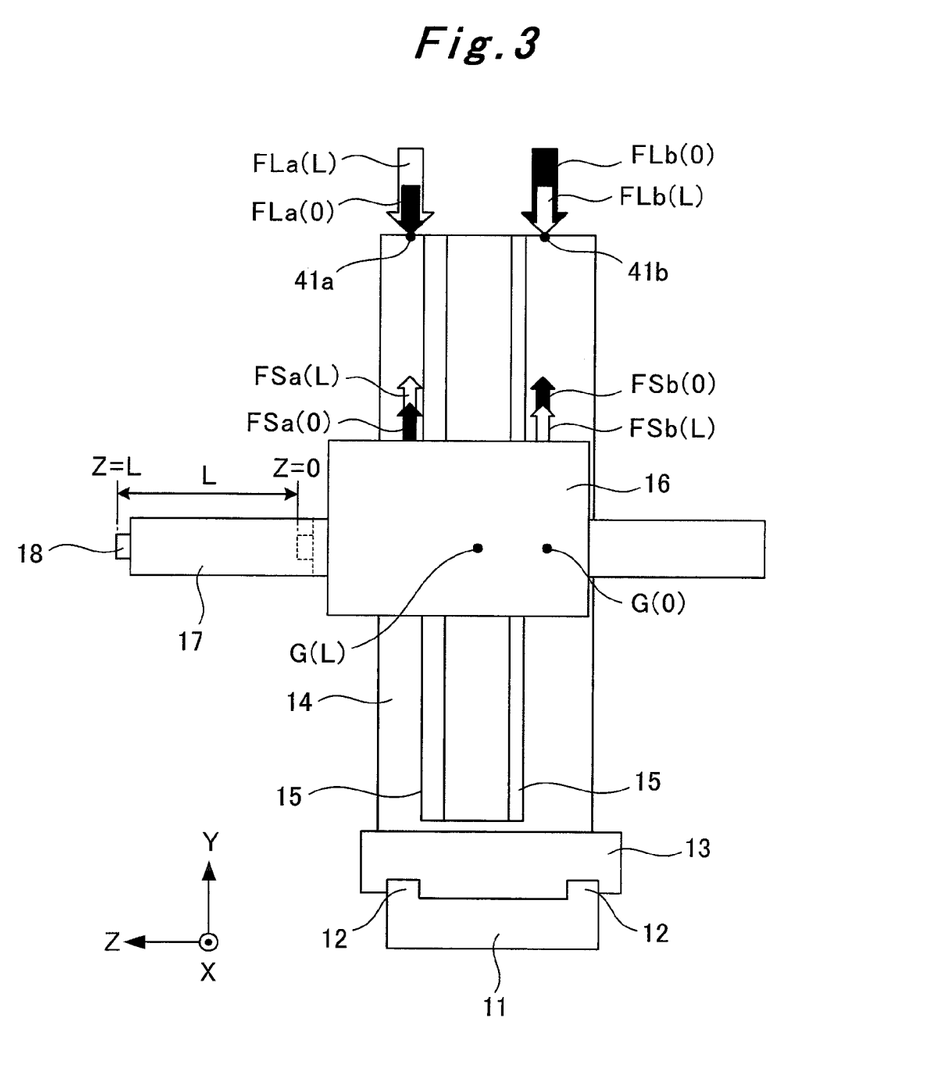
FIG. 3 is a view for explaining suspending force correction of a saddle and forces applied to the column in the suspending force correction of the saddle in the horizontal machine tool shown in FIG. 1.

Moreover, the horizontal machine tool 10 is provided with a suspending force correcting mechanism 30 configured to correct suspending forces of the saddle 16 when the ram 17 is delivered. Specifically, as shown in FIGS. 1 and 3, in an upper portion of the saddle 16, two suspended portions 31a, 31b arranged in the Z direction are suspended by wires 32a, 32b. The wires 32a, 32b are wound around pulleys 33a, 33b provided in an upper portion of the column 14 and are connected to a counter weight 34 disposed inside the column 14. One wire 32a is connected to the suspended portion 31a via a cylinder 35. A suspending force FSa in the suspended portion 31a and a suspending force FSb in the suspended portion 31b are corrected by controlling the cylinder 35 with the control device.

For example, as shown in FIG. 3, when the ram 17 is at the position of Z=0, the position of the center of gravity of the saddle 16 and the ram 17 is at the position of G(0). In this case, the inclination (turning) of the saddle 16 is suppressed by controlling the cylinder 35 in such a way that the suspending forces FSa, FSb satisfy FSa(0)<FSb(0) (see black arrows).

Meanwhile, when the ram 17 is at the position of Z=L (L is the maximum delivery amount of the ram 17; for example, about 1 m), the position of the center of gravity of the saddle 16 and the ram 17 is at the position of G(L). In this case, the inclination (turning) of the saddle 16 is suppressed by controlling the cylinder 35 in such a way that the suspending forces FSa, FSb satisfy FSa(L)>FSb(L) (see white arrows).

As described above, the suspending forces FSa, FSb at two positions of the saddle 16 are adjusted depending on the movement of the center of gravity from G(0) to G(L) which occurs along with the movement of the ram 17. This cancels a moment change occurring in the saddle 16 and the saddle 16 is maintained to be horizontal. As a result, the inclination (turning) of the saddle 16 is suppressed and local deformation in a sliding surface of the saddle 16 is prevented.

When the above-described correction of the suspending forces FSa, FSb is performed, forces applied to the wires 32a, 32b also change and forces transmitted to the upper portion of the column 14 via the pulleys 33a, 33b also changes. This is described with reference to FIGS. 3 and 4.

For example, as shown in FIG. 3, when the ram 17 is at the position of Z=0, the cylinder 35 is controlled to satisfy FSa(0)<FSb(0) as described above. Normally, the weight of the counter weight 34 is equal to (has the same weight as) the weight of the saddle 16 and the ram 17. Moreover, in the horizontal machine tool 10, the suspending forces FSa, FSb are corrected depending on the Z position of the ram 17. Accordingly, twice the load of the suspending force FSa(0) and twice the load of the suspending force FSb(0) act respectively on load centers 41a, 41b (load centers of the saddle 16, the ram 17, and the counter weight 34) on which the loads of the suspending forces FSa, FSb act, and these loads FLa, FLb satisfy FLa(0)<FLb(0) (see black arrows).

Meanwhile, when the ram 17 is at the position of Z=L, the cylinder 35 is controlled to satisfy FSa(L)<FSb(L) as described above. Accordingly, twice the load of the suspending force FSa(L) and twice the load of the suspending force FSb(L) act respectively on the load centers 41a, 41b, and these loads FLa, FLb satisfy FLa(L)>FLb(L) (see white arrows).

Figure 4:
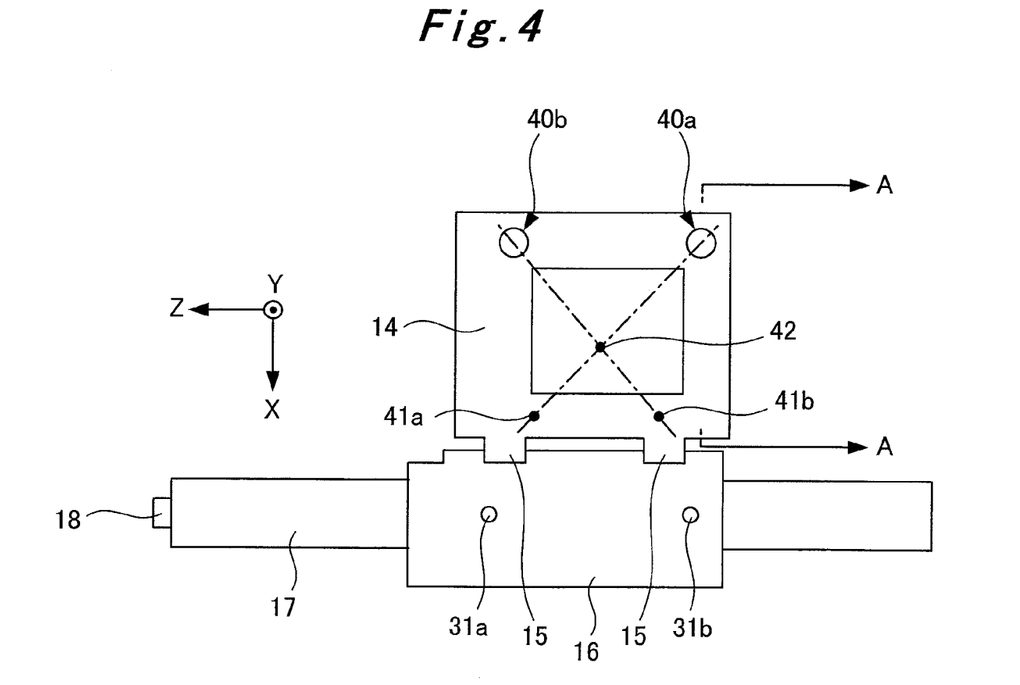
FIG. 4 is a top view for explaining a column tension bar in the horizontal machine tool shown in FIG. 1.

As described above, the loads FSa, FSb acting on the load centers 41a, 41b change along with the correction of the suspending forces FSa, FSb. As a result, a bending moment is applied to the upper portion of the column 14 and the inclination (bending) of the column 14 and the inclination (sinking) of the bed thereby occur. In order to cancel the moment occurring due to the change in the suspending forces FSa, FSb and thereby correct the bending of the column 14, two column tension bars 40 (40a, 40b) are provided in the horizontal machine tool 10 on a side (back portion side) of a lateral surface of the column 14 opposite to the lateral surface provided with the saddle 16 and the ram 17. More specifically, the column tension bars 40a, 40b are arranged respectively at positions point symmetric to the load centers 41a, 41b with respect to the center 42 of the second moment of area of the column 14.

Figure 5:
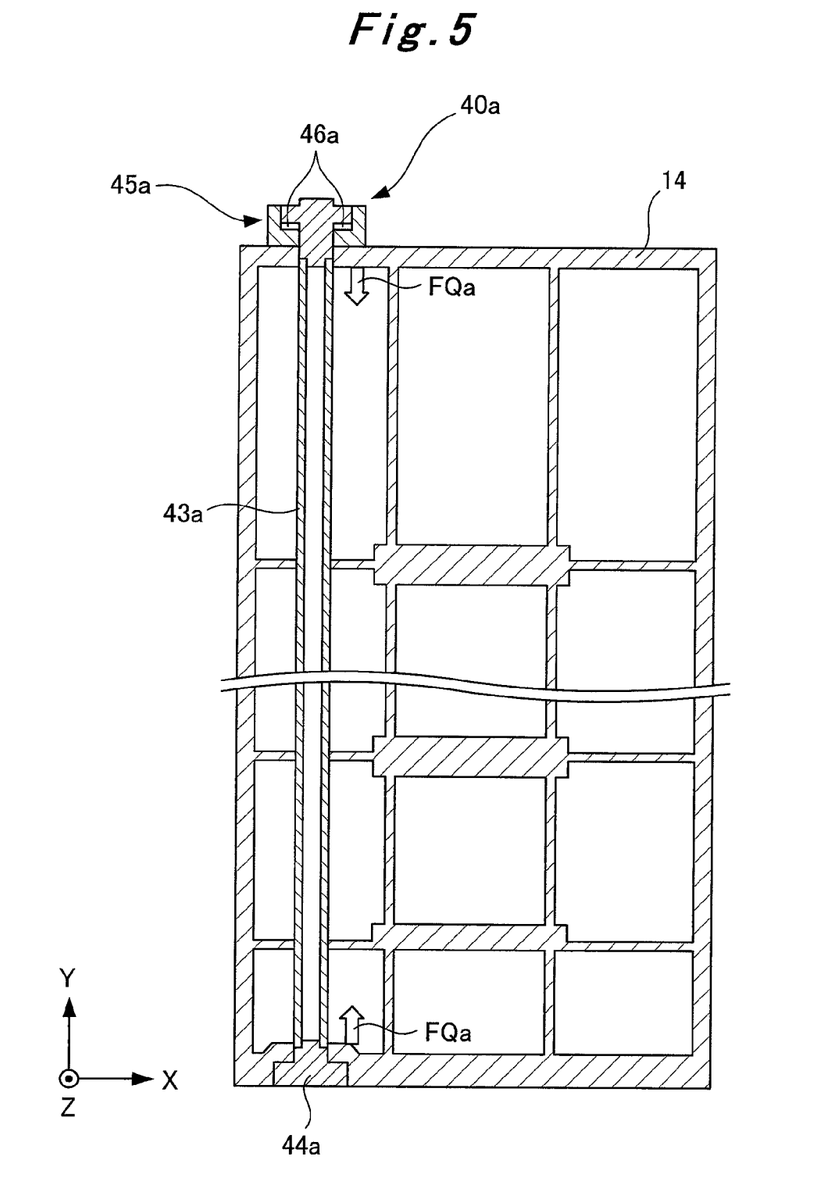
FIG. 5 is an arrow cross-sectional view of the column shown in FIG. 4 taken along the A-A line.

As shown in the cross-sectional view of FIG. 5, the column tension bar 40a is provided inside the column 14 to extend in the height direction of the column 14. Specifically, the column tension bar 40a has a configuration similar to that of the ram tension bar 20 and includes a cylindrical rod 43a disposed to extend in a longitudinal direction of the column 14, a stopper 44a disposed in a bottom portion of the column 14, and a cylinder portion 45a disposed in the upper portion of the column 14. Hydraulic pressure is supplied to a hydraulic chamber 46a of the cylinder portion 45a and a tensile force FQa is thereby applied to upper and lower ends of the column 14 by the stopper 44a and the cylinder portion 45a. The upper and lower ends of the column 14 are pulled inside by this tensile force FQa.

The column tension bar 40b also has a similar configuration and upper and lower ends thereof are pulled inside with a tensile force FQb. The tensile force FQa generated by the column tension bar 40a and the tensile force FQb generated by the column tension bar 40b are controlled by using the control device to generate a bending moment in the column 14, and the bending of the column 14 is corrected by this bending moment.

For example, as shown in FIG. 3, when the ram 17 is at the position of Z=0, the cylinder 35 is controlled to satisfy FSa(0)<FSb(0) and loads satisfying FLa(0)<FLb(0) are thus applied to the load centers 41a, 41b as described above. At this time, in the column tension bars 40a, 40b, the tensile forces are controlled to satisfy FQa (0)<FQb (0) and the bending of the column 14 is thereby corrected.

Meanwhile, when the ram 17 is at the position of Z=L, the cylinder 35 is controlled to satisfy FSa(L)>FSb(L) and loads satisfying FLa (L)>FLb (L) are thus applied to the load centers 41a, 41b as described above. At this time, in the column tension bars 40a, 40b, the tensile forces are controlled to satisfy FQa(L)>FQb(L) and the bending of the column 14 is thereby corrected.

In order to check the effects of the two column tension bars 40a, 40b described above, analysis was performed by adding the mechanically-calculated tensile forces FQa, FQb to a FEM (finite element method) model for the case where the ram 17 was at the position of Z=0 and for the case where the ram 17 was at the position of Z=L. As a result, almost no bending of the column 14 due to a moment change occurred and the deflection was about 12 μm even when the ram 17 was at the position of Z=L. Hence, it was confirmed that the correction can be performed very accurately (see the position of Y=H in FIG. 9 to be described later).

It is possible to correct (B1) the deflection of the ram 17 due to its own weight, (B2) the inclination (turning) of the saddle 16 due to a change in the center of gravity, and (B3) the bending of the column 14 due to the change in the suspending forces which occurs along with the change in the center of gravity, by using the configuration described above, i.e. the column tension bar 20, the suspending force correcting mechanism 30, and the column tension bars 40a, 40b.

The correction with the ram tension bar 20, the suspending force correcting mechanism 30, and the column tension bars 40a, 40b is analyzed by using a FEM model for the case where the ram 17 is at the position of Z=0 and Y=H (H is the maximum height position of the ram 17; for example, about 5 m) and for the case where the ram 17 is at the position of Z=L, Y=H. It can be confirmed from this analysis that the bending of the column 14 is corrected and the sliding surface (for example, the guide 15) thereof is substantially straight, but the inclination of the column 14 has changed greatly due to the inclination (sinking) of the bed 11 (see Part (a) of FIG. 8 to be described later).

In other words, (B4) the inclination (sinking) of the bed due to the change in the center of gravity is not corrected in the configuration described above. However, it is found from the above analysis that only the inclination of the column 14 changes depending on the Z position of the ram 17. Accordingly, the spatial accuracy can be corrected by using a correction amount corresponding to the Z position of the ram 17 to correct the straightness of the Y axis.

The control device of the horizontal machine tool 10 has a spatial accuracy correcting function by NC (numerical control). Specifically, a correction map for correction according to a movement amount of the Y axis and a movement amount of the Z axis is created in advance by using the spatial accuracy correction and the Z coordinate is corrected based on the position of the ram 17 on the Y axis and the delivery amount (movement amount of the Z axis) of the ram 17. The straightness change of the Y axis is thereby corrected and the inclination (sinking) of the bed due to the change in the center of gravity is corrected. Hence, the machining accuracy of the horizontal machine tool 10 is improved. A formula used for the spatial accuracy correction will be described together with FIG. 8 to be described later.

Generally, in the spatial accuracy correction by NC, there are created in advance a correction map for correction according to movement amounts (position of the main spindle) of the x axis, the y axis, and the z axis and a correction map for correction according to movement amounts (posture of the main spindle) of an A axis (inclination of the main spindle) and a C axis (turning of the main spindle). The front end position of the tool attached to the main spindle is corrected by using these correction maps and the machining accuracy is thereby improved.

As described above, in the horizontal machine tool 10, deterioration of the spatial accuracy (deterioration of the straightness of the Y axis to a reference plane) which is caused by the inclination (sinking) of the bed due to the change in the center of gravity is corrected by using the spatial accuracy correction by NC.

Normally, when the bending (inclination) of the structural parts is corrected by using the ram tension bar, the suspending force correcting mechanism, and the column tension bars, there is a tradeoff relationship between the spatial accuracy and swinging of the main spindle. Accordingly, the swinging of the main spindle deteriorates when priority is given to the spatial accuracy while the spatial accuracy deteriorates when priority is given to the swinging of the main spindle. Moreover, the spatial accuracy correction is implemented as a function of the NC and only the position is corrected. Accordingly, the swinging of the main spindle cannot be corrected.

In view of this, in the horizontal machine tool 10, the deflection of the ram 17 which occurs when the ram 17 is delivered is corrected with the ram tension bar 20, the inclination of the saddle 16 due to the change in the center of gravity is corrected with the suspending force correcting mechanism 30, and the bending of the column 14 due to the change in the suspending forces which occurs along with the change in the center of gravity is corrected with the column tension bars 40a, 40b. This stabilizes the swinging of a front end of the main spindle 18. Moreover, the sinking of the bed 11 due to the change in the center of gravity is corrected by the spatial accuracy correction with the swinging of the front end of the main spindle 18 stabilized. In the configuration described above, it is possible to constantly maintain the swinging of the main spindle and the machining accuracy in a stable state and drastically improve the machining accuracy in the entire range of stroke of the horizontal machine tool 10.

Graphs in FIGS. 6 to 9 show the results of analysis on the accuracy of the horizontal machine tool 10 having the configuration described above which was performed by using a FEM model.

Figure 6:
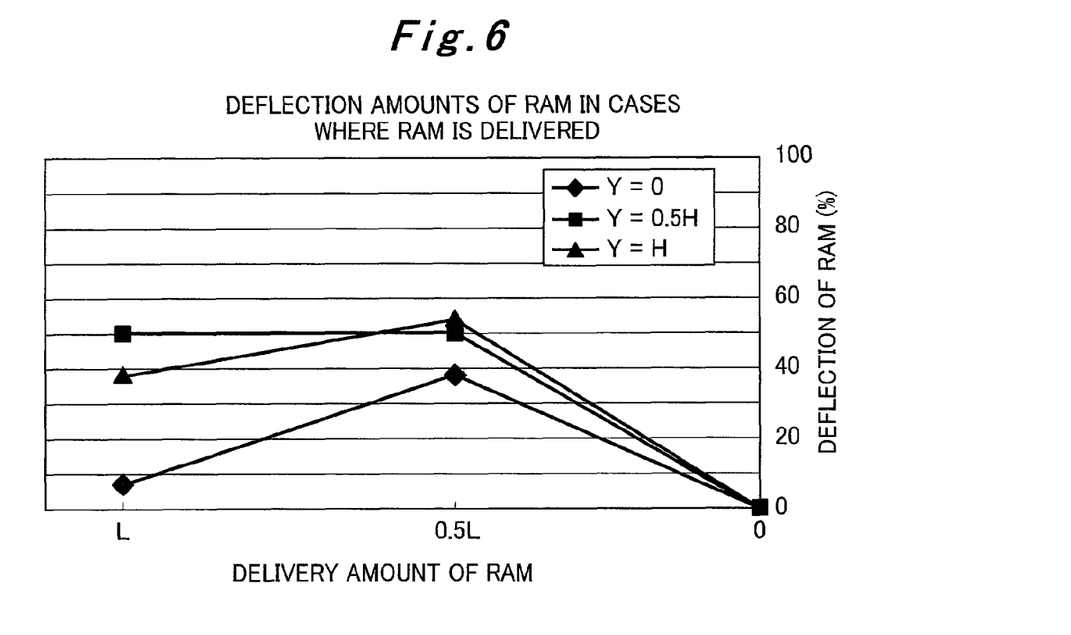
FIG. 6 is a graph showing deflection amounts of a ram after the correction which is performed when the ram is delivered, in the horizontal machine tool shown in FIG. 1.

For example, FIG. 6 is a graph showing the deflection amounts of the ram 17 in cases where the ram 17 is delivered. In this graph, the deflection amounts in the cases where the delivery amount of the ram 17 is Z=0, Z=0.5 L, and Z=L are obtained by FEM analysis for each of the cases where the Y axis position of the ram 17 is Y=0, Y=0.5H, and Y=H. As shown in FIG. 6, the changes in the deflection amounts of the ram 17 all have substantially the same change tendency. Assuming that general allowable accuracy of the ram straightness is 100%, the deflection amount after the correction which is shown in FIG. 6 is 55% at the largest. Accordingly, it is found that the correction can secure such high accuracy that the deflection amount is not higher than half the general allowable accuracy.

Figure 7:
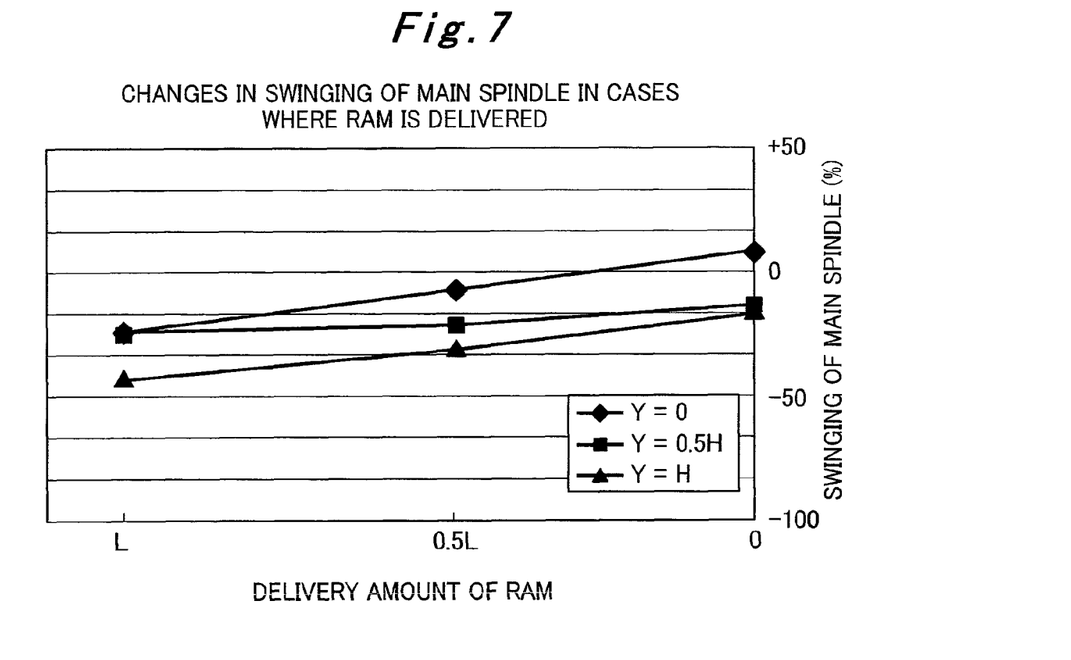
FIG. 7 is a graph showing changes in swinging of the main spindle after the correction which is performed when the ram is delivered, in the horizontal machine tool shown in FIG. 1.

Moreover, FIG. 7 is a graph showing changes in the swinging of the main spindle 18 in cases where the ram 17 is delivered. In this graph also, the changes in the swinging of the main spindle 18 in the cases where the delivery amount of the ram 17 is Z=0, Z=0.5 L, and Z=L is obtained by FEM analysis for each of the cases where the Y axis position of the ram 17 is Y=0, Y=0.5H, and Y=H. As shown in FIG. 7, the changes in the swinging of the main spindle 18 all have substantially the same change tendency. Assuming that general allowable accuracy of the change in the swinging of the main spindle is 100%, the change in the swinging of the main spindle after the correction which is shown in FIG. 7 is 42% at the largest. Accordingly, it is found that the correction can secure such high accuracy that the change in the swinging of the main spindle is about half the general allowable accuracy.

Figure 8A:
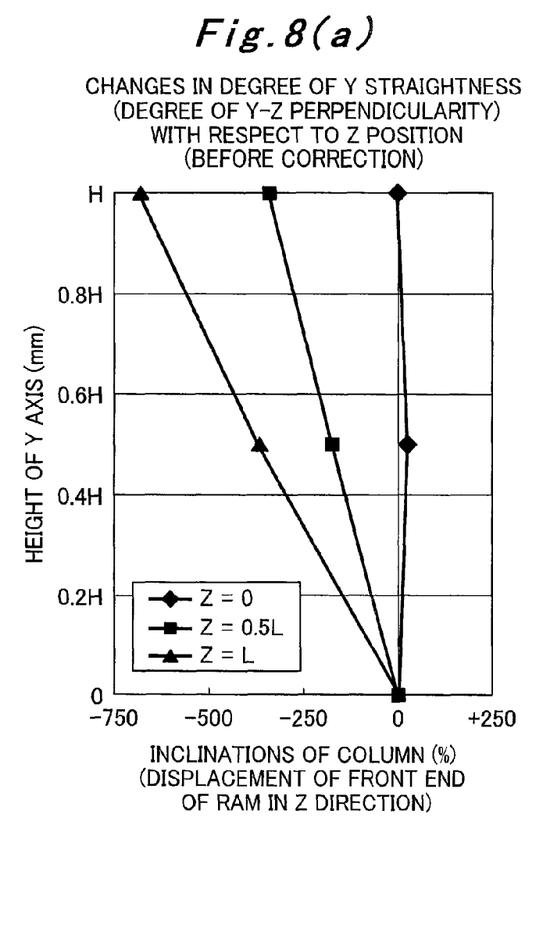
FIG. 8 includes graphs showing changes in a degree of Y straightness (degree of Y-Z perpendicularity) in the horizontal machine tool shown in FIG. 1, Part (a) is a graph before the correction, and Part (b) is a graph after the correction.
Figure 8B:
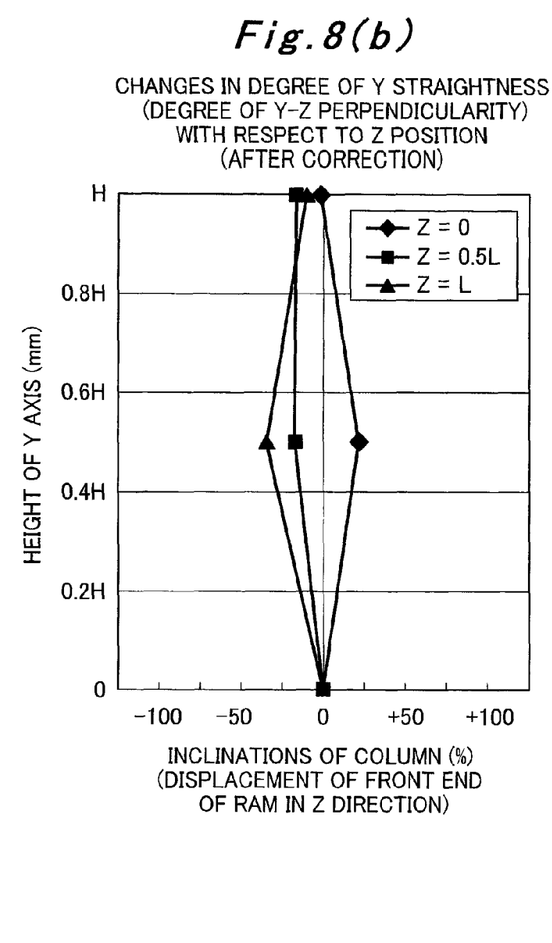

Furthermore, FIG. 8 is a graph showing degrees of straightness of the Y axis with respect to the Z position of the ram 17 (degrees of perpendicularities of Y axis-Z axis). Part (a) of FIG. 8 shows the degrees of straightness before the correction and Part (b) of FIG. 8 shows the degree of straightness after the correction. The inclinations of the column 14 (displacement of the front end of the ram 17 in the Z direction) at the positions of Y=0, Y=0.5H, and Y=H are obtained by FEM analysis for each of the cases where the delivery amount of the ram 17 is Z=0, Z=0.5 L, and Z=L. Note that, in Parts (a) and (b) of FIG. 8, it is assumed that general allowable accuracy of the column inclination is 100% and the horizontal axis is shown by using this accuracy as a reference.

As shown in Part (a) of FIG. 8, when no correction (spatial correction) is performed (note that the correction with the ram tension bar 20, the suspending force correcting mechanism 30, the column tension bars 40a, 40b is performed), the degree of perpendicularity of the Y axis to the reference plane (Z axis) changes greatly depending on the delivery amount of the ram 17 and the inclination of the Y axis changes in proportion to the delivery amount. However, the straightness of the Y axis itself is good.

Accordingly, a correction amount δz of the Z position is obtained based on the delivery amount zs of the ram 17 and the Y axis coordinate y, by using the formula shown below. In the formula shown below, a represents a correction coefficient.

$$\delta z = (a \times zs) \times y$$

Part (b) of FIG. 8 is a graph after the correction performed by using the above formula. As shown in Part (b) of FIG. 8, when the correction (spatial accuracy correction) is performed, the degree of perpendicularity of the Y axis to the reference plane (Z axis) is corrected together with the degree of straightness of the Y axis and the accuracy thereof is 10 μm or less. Accordingly, it is possible to secure such high accuracy that the numerical value of the accuracy is not greater than half the value of the general allowable accuracy.

Figure 9:
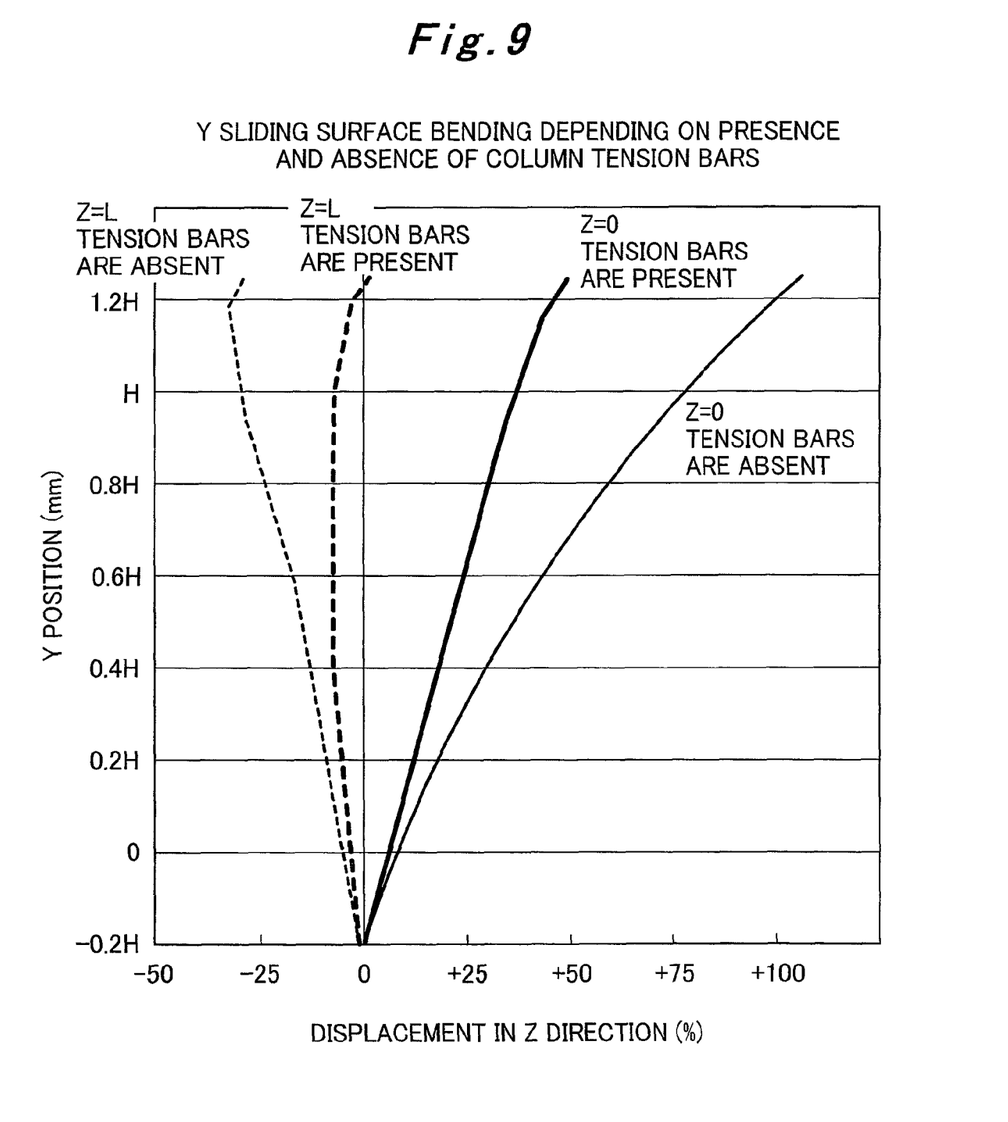
FIG. 9 is a graph showing Y sliding surface bending depending on the presence and absence of the column tension bars.

FIG. 9 is a graph showing Y sliding surface bending (bending of the column 14) depending on the presence and absence of the column tension bars 40a, 40b. Here, z direction displacements in the cases where the delivery amount of the ram 17 is Z=0 and Z=L are obtained by FEM analysis for each of the cases where the column tension bars 40a, 40b are present and are absent.

As shown in FIG. 9, when there are no column tension bars, the displacements change greatly in the Z direction in the upper portion (Y position=1.2H) of the column 14. Reason for this is assumed to be the effect of the suspending force correction of the saddle 16. When the column 14 is greatly bent as described above, the swinging of the main spindle 18 becomes different between a high Y position and a low Y position. Thus, the suspending forces FSa, FSb of the saddle 16 and the tensile force FP of the ram tension bar 20 are required to be changed depending on the Y position and the Z position and the correction becomes complicated.

Meanwhile, when the column tension bars 40a, 40b are present, in the upper portion (Y position=1.2H) of the column 14, the change amount in the z direction is about 40% at the largest, assuming that the change amount in the case where there are no column tension bars is 100%. The change amount is thus reduced to half or less compared to that in the case where there are no tension bars.

The following fact is found from the above results. Such high accuracy that the numerical value of the accuracy is not higher than half the numerical value of the general allowable accuracy can be secured by performing the correction of the swinging of the main spindle by the ram tension bar 20, the suspending force correcting mechanism 30, and the column tension bars 40a, 40b together with the spatial accuracy correction. As a result, the machining accuracy can be improved.

In other words, the correction with the ram tension bar 20, the suspending force correcting mechanism 30, and the column tension bars 40a, 40b is used only to stabilize the swinging of the front end of the main spindle 18. The spatial accuracy is corrected by using the spatial accuracy correction by NC with the swinging of the front end of the main spindle 18 stabilized as described above. This achieves both the stabilization of the swinging of the main spindle and the improvement in the spatial accuracy and the accuracy can be thereby drastically improved.

Moreover, the horizontal machine tool 10 of the embodiment includes no balance weight (see Japanese Utility Model Registration Application Publication No. Hei 1-31367 for example) which suppresses the movement of the center of the gravity of the tool and used to maintain complete balance. Accordingly, the cost of the apparatus can be reduced.

INDUSTRIAL APPLICABILITY

The present invention is suitable for a horizontal machine tool.

EXPLANATION OF THE REFERENCE
NUMERALS

10 horizontal machine tool
11 bed
14 column
16 saddle
17 ram
18 main spindle
20 ram tension bar
30 suspending force correcting mechanism
40, 40*a*, 40*d* column tension bar

The invention claimed is:

1. A horizontal machine tool including; a column provided on a bed to be movable in a horizontal direction; a saddle supported on a lateral surface of the column to be movable in a vertical direction; and a ram held by the saddle to be movable in a horizontal direction and provided with a main spindle at a front end, the horizontal machine tool comprising:
    a ram tension bar configured to correct deflection of the ram;
    a suspending force correcting mechanism configured to correct inclination of the saddle by adjusting suspending forces at two positions for suspending the saddle;
    a column tension bar configured to correct bending of the column; and
    a control device configured to control the ram tension bar, the suspending force correcting mechanism, and the column tension bar and having a spatial accuracy correcting function of correcting a spatial accuracy by numerical control, wherein
    the control device
        corrects only swinging of a front end of the main spindle by using the ram tension bar, the suspending force correcting mechanism, and the column tension bar, and
        corrects deterioration in the spatial accuracy due to sinking of the bed by using the spatial accuracy correcting function.

2. The horizontal machine tool according to claim 1, wherein two of the column tension bars are provided on a side of a lateral surface of the column opposite to the lateral surface on which the saddle is supported.

3. The horizontal machine tool according to claim 2, wherein the column tension bars are arranged respectively at positions point symmetric to two load centers with respect to a center of a second moment of area of the column, the two load centers being portions on which loads of the two suspending forces act.

\* \* \* \* \*